Sept. 10, 1968 J. H. NEHER 3,401,395

FAULT RECORDER

Filed Sept. 21, 1964 2 Sheets-Sheet 1

INVENTOR
John H. Neher
BY
[signature]
ATTORNEYS

Sept. 10, 1968 J. H. NEHER 3,401,395

FAULT RECORDER

Filed Sept. 21, 1964 2 Sheets-Sheet 2

INVENTOR.
John H. Neher

BY

ATTORNEYS

United States Patent Office 3,401,395

Patented Sept. 10, 1968

3,401,395

FAULT RECORDER

John H. Neher, 600 Sussex Road, Wynnewood, Pa. 19096

Filed Sept. 21, 1964, Ser. No. 397,909

7 Claims. (Cl. 346—74)

ABSTRACT OF THE DISCLOSURE

A continuous loop magnetic tape recorder for facilitating determinations of the causes of power circuit faults which provides records of current and/or voltage for prefault and postfault periods of at least several minutes. The desired parameter is continuously recorded on the tape and the record is erased just before beginning the succeeding cycle of the loop. The occurrence of a fault triggers an overcurrent fault detector which starts a motor-driven timer arranged to stop the tape transport upon timing out.

*Description of invention*

The present invention relates to prefault recorders for electric power systems and the like.

A purpose of the invention is to provide a prefault recorder which will also give an adequate record of postfault conditions.

A further purpose is to utilize a continuous loop magnetic tape recorder for prefault recording.

A further purpose is to continuously record the conditions in an electric circuit or plurality of electric circuits on a continuous loop magnetic tape recorder, and in case of occurrence of a fault to continue operation of the magnetic tape recorder for a predetermined period of postfault time and then interrupt operation.

A further purpose is to energize a timer which will interrupt postfault operation of a continuous loop magnetic tape recorder by a high speed fault detector controlled by a current derived from the fault.

Further purposes appear in the specification and in the claims.

In the drawings I have chosen to illustrate a few only of the numerous embodiments in which the invention may appear, selecting the forms shown from the standpoints of convenience in illustration, satisfactory operation, and clear demonstration of the principles involved.

When a fault occurs in an electric power system or other electric system, it is desirable to have a record of the line current, the line voltage, or both, during a time previous to and during the fault, in order to determine the cause and the effects. Ideally, voltage or current, or both, should be recorded for several minutes before and after the fault.

Previous prefault magnetic recorders have consisted of magnetic drums on which circuit conditions were continously recorded and then erased just before the completion of one rotation of the drum, preparatory to receiving new signals. Upon the occurrence of the fault, both the recording and erasing were stopped after a predetermined delay interval so that records both before and after the fault were stored on the drum.

Because high speed of drum rotation was necessary in order to obtain desired resolution of high frequency transients, it has been possible to record only a few seconds of record of operation, for example, one second prefault and two seconds postfault. These devices, therefore, have not been suitable for prefault recording over several minutes or for extended postfault recording during periods of tryback of tripped lines.

The present invention contemplates producing a magnetic type prefault recorder which has sufficient accuracy for use in the great majority of the applications, which can record at least several minutes prior to a fault and continue for a period of an hour or more after a fault so as to record any succeeding faults including the trybacks.

The device of the invention is produced at low cost, is rugged and serviceable.

The device of the invention uses a continuous loop magnetic tape recorder which continously operates to record the conditions in an electrical line or a plurality of lines.

An extremely rapid and sensitive fault detector is employed which has timer delayed lockout means, and this stops the tape recorder at a predetermined time after the fault and before the tape loop has made a complete traverse.

It is then very simple to substitute a new tape cartridge and manually restore the device to operation while the tape cartridge recording the fault can be removed to a convenient location for analysis by playing back this portion of the tape containing the fault records, for example, into a conventional oscillograph by means of a tape recorder. It is very easy to apply a calibration magnetic recording by applying a 60 cycle alternating current signal of known magnitude to all channels of the tape for a few seconds prior to the removal of the cartridge from the tape transport system.

Figure 1:
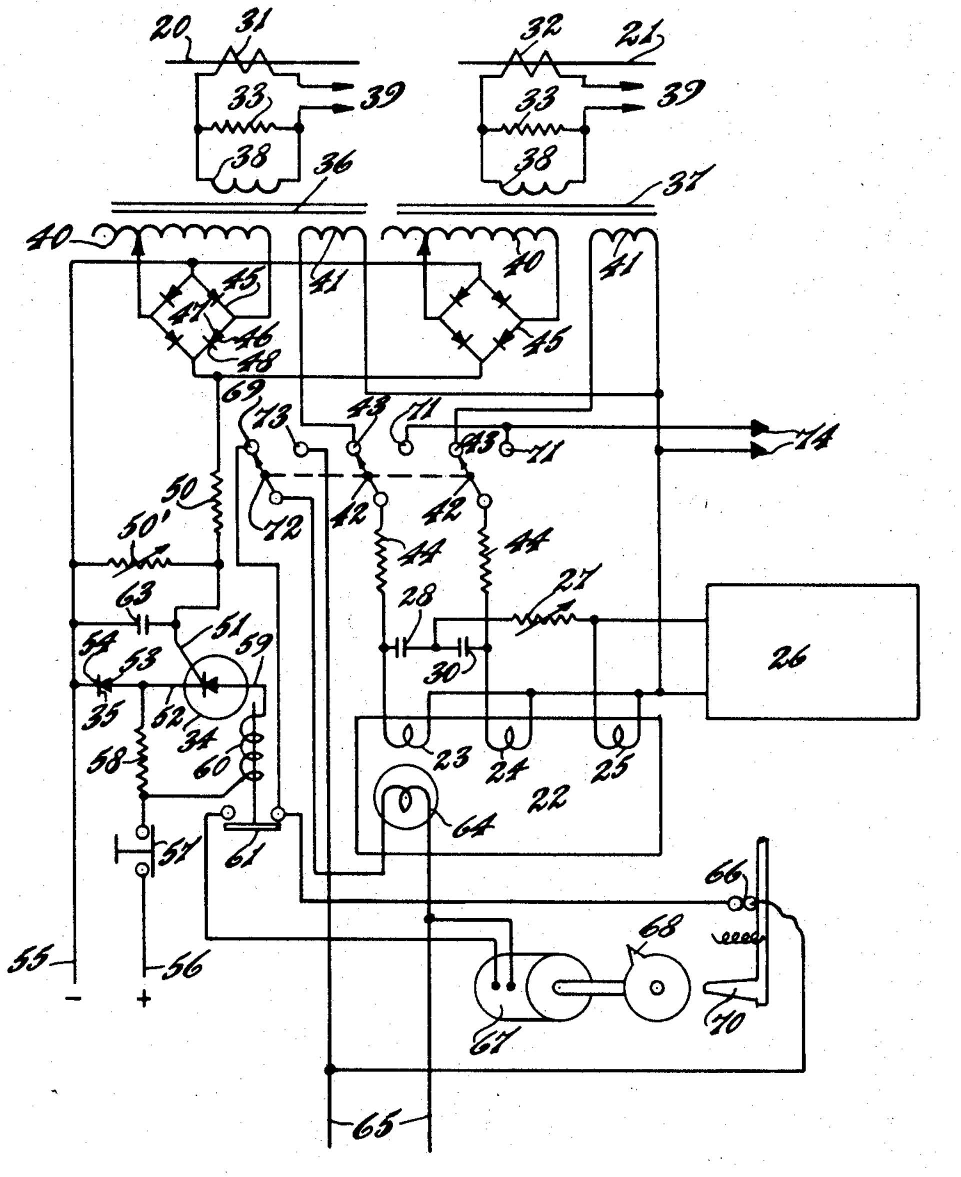
FIGURE 1 is an electric circuit diagram of a magnetic tape power system prefault recorder of the invention applied to record currents.

FIGURE 1 shows the device of the invention for recording the currents in two alternating current electric power conductors 20 and 21 by means of a magnetic tape recorder 22 having a continuous loop. Devices of this kind are commercially available, described for example in Borg-Warner Controls Bulletin R–302–862 and Viking of Minneapolis, Inc., catalogues on the 35 series and the 36 series tape cartridge handler or in U.S. Patents 2,778,880, granted Jan. 22, 1957, for Endless Magnetic Tape Cartridge and Recording Play-Back Instrument Mounting Same, and 2,876,005, granted Mar. 3, 1959, for Recorder-Play Back Instrument Employing Endless Magnetic Tape, in both of which the patentee is G. H. Eash. The tape recorder 22 has separate recording heads 23 and 24 serving different channels and a continuously operating erasing head 25. The erasing head is continuously energized by a conventional bias oscillator 26 and this also serves to supply the bias to the recording heads through an adjustable biasing resistor 27 and coupling capacitors 28 and 30 connected to the respective recording heads. Coupling to the conductors 20 and 21 is provided by current transformers 31 and 32 connected to the respective conductors, these secondary circuits of these current transformers included in series instruments and relays at 39 (not illustrated) and shunt resistors 33, a voltage being produced across these resistors proportional to the magnitudes of the currents in the line conductor.

The shunts 33 are adjusted to select the desired voltage level, say about five volts, at maximum current.

The circuit includes a solid state fault detector, suitably a silicon controlled rectifier 34. The signals to the fault detector and the recording heads are supplied by isolation transformers 36 and 37, each of which has a low voltage winding 38 connecting across the shunt resistor 33 and also a tapped high voltage winding 40 and a second low voltage winding 41. Each of the transformers 36 and 37 has an insulation strength comparing with that normally used between the separate secondary circuits in a power station.

The low voltage windings 41 are each connected to one of the recording heads 23 or 24 through one of the switch arms 42 connected to switch terminals 43, and through series resistors 44.

Each of the high voltage windings 40 is connected to opposite input terminals of a bridge rectifier 45 consisting of suitable silicon diode rectifiers 46 having anodes 47 and cathodes 48, the respective branches connected across the high voltage winding being connected anode-to-cathode and cathode-to-anode. At opposite intermediate points of each bridge rectifier, the output is connected in parallel at one side to the gate connection 51 of silicon controlled rectifier 34 through series resistor 50 of a voltage divider including adjustable shunt resistor 50'. The cathode connection 52 of silicon controlled rectifier 34 is connected to the anode 53 of biasing diode 35, suitably a silicon rectifier, the cathode 54 of which is connected to the opposite side of the output of both bridge rectifiers 45. A direct current source is connected at the negative side 55 to the cathode 54 of the biasing diode 35 and at the positive side 56 through normally closed push button circuit opening switch 57 and a biasing resistor 58 is connected to the anode 53 of biasing diode 35 and also the cathode connection 52 of silicon controlled rectifier 34.

Under certain conditions, particularly where adequate current is available for input to the gate 51 and the silicon controlled rectifier 34 is relatively not of high sensitivity, the diode 35 and the biasing resistor 58 are not required and may be dispensed with, in which case the cathode 52 of the silicon controlled rectifier 34 may be connected directly to the negative side 55 of the direct current source.

A magnet coil 60 of relay 61 is connected in circuit between anode connection 59, of silicon controlled rectifier 34 and the positive side 56 of the direct current source through switch 57.

By-pass capacitor 63 is connected in parallel with adjustable shunt resistor 50' between gate 56 and the negative side 55 of the direct current source.

Electric motor 64 driving the tape recorder is energized from power source 65 through normally closed lockout switch 66. Relay 61 when energized closes the circuit from the power source 65 to start the electric motor driving timer 67 and when the timer times out its timing cam 68 moves switch operator 70 to open lockout switch 66, interrupting the operation of the motor driving the tape recorder and also disconnecting the timer.

When switch arm 72 is thrown over to connect the contact 73 it connects the tape recorder drive motor 64 directly to source 65 instead of through lockout switch 65 and contact 69. When switch arms 42 connect to contact 71 the individual recording heads are directly connected to calibrating source 74, suitably at about 5 volts AC.

The operation of the device is as follows:

The tape recorder motor 64 is energized through normally closed contacts 66 and tape recorder 22 operates continuously to transport the tape past erase head 25 and recording heads 23 and 24 which will record the currents flowing in line conductors 20 and 21. Records thus placed on the tape will remain for a period of time equal to that required for a complete traverse of the tape, suitably approximately one hour.

The sensitivity of the fault detector system is set by the proper selection of the taps on transformer secondaries 40 and the setting of variable resistor 50' so that the signal appearing at the gate 51 of silicon controlled rectifier 34 as a result of normal current flow in either line conductor 20 or 21 will be below the firing point of silicon controlled rectifier 34.

A substantial increase of the current in either line conductor 20 or 21 or both, which is indicative of a fault condition, will increase the signal at the gate 51 of the silicon controlled rectifier 34 above the firing point, thus causing the silicon controlled rectifier to fire. This causes relay 61 to pick up and energize timing motor 67, advancing timing cam 68. Because of the inherent lock-in action of the silicon controlled rectifier, relay 61 will remain energized after the fault condition cease.

When timing cam 68 reaches switch operator 70, lockout switch 66 opens and stops both the timing motor 67 and tape transport motor 64. The time required for this to occur is selected to be several minutes less than that required for a complete traverse of the tape. Thus, if the lockout operation occurs in 45 minutes with a 60-minute tape, the resulting record will consist of 15 minutes of prefault recording and 45 minutes of postfault recording. During this latter period, any abnormal or fault conditions subsequent to the initial fault operation will be recorded.

Prior to removing the tape, a calibration run of several seconds is made by throwing switch arms 72 and 42 to contact switch points 73 and 71. This by-passes lockout contacts 66, permitting motor 64 to transport the tape and simultaneously connects recording heads 23 and 24 in series with resistors 44 to a calibrating voltage source 74 of known value.

The system is then reset by throwing switch arms 72 and 42 to contacts 69 and 43, by momentary operation of push button 57 which unlocks relay 61, and then by manually repositioning timing cam 68.

Figure 2:
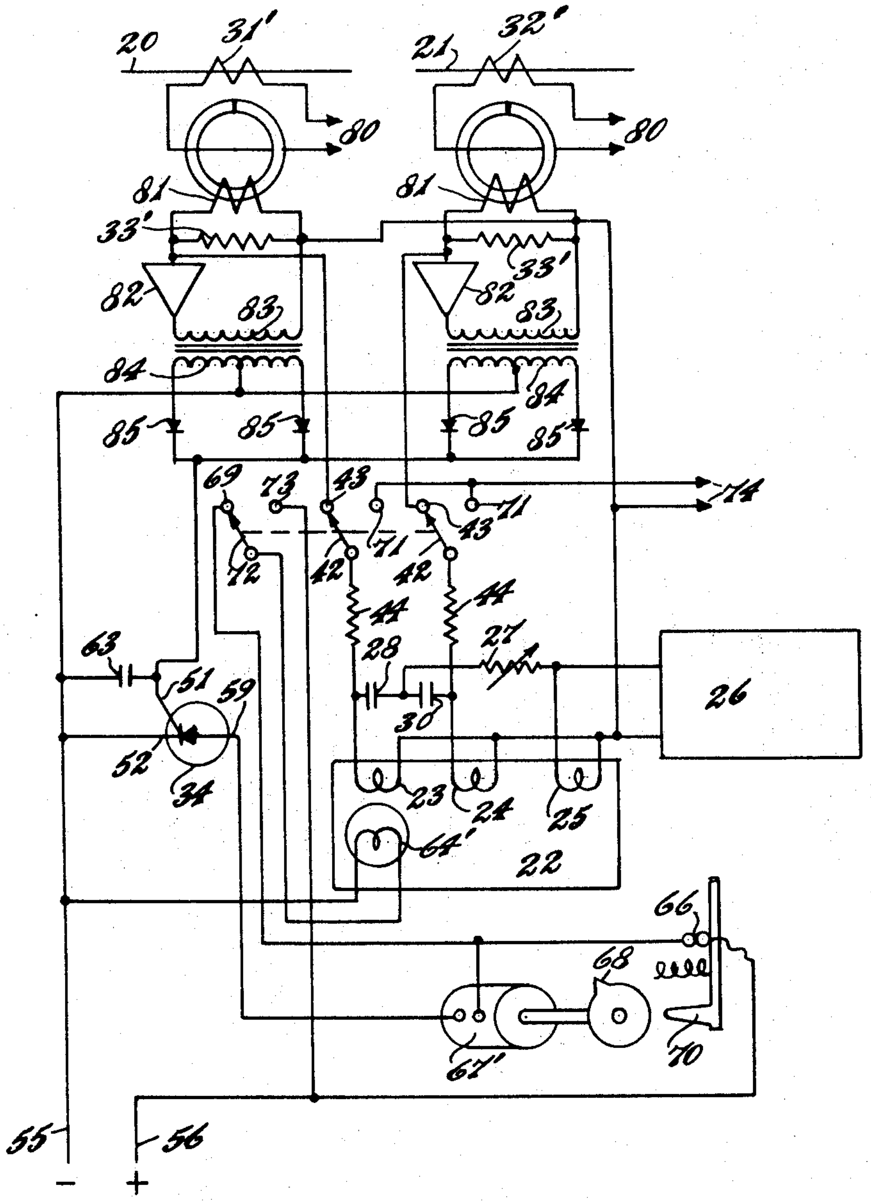
FIGURE 2 is a circuit diagram of a variant form of the device.

In the modification of FIGURE 2, conventional line current transformers 31' and 32' are shown with their secondaries connected at 80 to instruments and relays (not illustrated). A respective isolating current transformer 81 of the split core clamp-on type is detachably clamped over a secondary conductor of each current transformer 31' and 32' to avoid disturbing the normal connection of these secondaries to their respective instruments and relays. Connected across the secondary winding of each transformer 81 is a shunt 33' to provide a voltage proportional to the respective line current.

The recording heads 23 and 24 and their associated series resistors 44 are connected directly across the shunts 33' through switch terminals 43 and switch arms 42. Adjustable gain amplifiers 82 provided with output transformers 83 are also connected across shunts 33'. The transformers 83 have center tapped secondaries 84 which are connected to the anodes of rectifiers 85 to produce full wave rectification. The direct current outputs of the rectifiers 85 are connected in parrallel, the positive polarity outputs being connected to the gate 51 of the silicon controlled rectifier 34, and the negative polarity outputs being connected to the negative side 55 of the direct current source.

The use of adjustable gain amplifiers 82 provides the required adjustability of pick-up sensitivity in lieu of the resistors 50 and 50' of the circuit of FIGURE 1, and these resistors may therefore be omitted.

The bypass capacitor 63 is connected between the gate 51 and the negative side 55 of the direct current source. The cathode of the silicon controlled rectifier 34 is connected to the negative side 55 of the direct current source. The anode 59 of the silicon controlled rectifier is connected to one terminal of the electric motor driving timer 67', its other terminal being connected through the lockout switch 66 to the positive side 56 of the direct current source. Electric motor 64' is connected between the negative side 55 of the direct current source and through switch arm 72, the contact 69 and lockout switch 66 to the positive side 56 of the direct current source. It is to be understood that in this modification the drive motors 64' and 67' are direct current motors whereas in the device of FIGURE 1 they may be for direct current or alternating current.

The operation of this modification is identical with that of the device of FIGURE 1, except that the drive motors 64' and 67' are directly in series with the anode of the silicon controlled rectifier 34 without an intermediate relay. When switch arms 72 and 42 are thrown to contact switch points 73 and 71, for calibrating purposes, the tape recorder drive motor 64' is connected directly to the positive side 56 of the direct current source, rather than through the lockout switch 66.

While only two recording channels are shown in FIGURES 1 and 2, it will be appreciated by those skilled in the art that a plurality of such channels may be employed limited only by the width of the tape employed.

It is sometimes desirable to record line voltages as well as line currents on the tape during the record prefault and post-fault periods. This is readily accomplished by connecting a recording head of the recorder 22, such as the heads 23 or 24 to the output of suitable conventional potential transformers connected to the power line in a manner well known in the art.

The specific components used in a particular example of the circuit of FIGURE 1 had electrical dimensions as follows:

Shunts 33 had resistances of 0.05 ohm.

Current transformers 31 and 32 are conventional current transformers, provided with iron cores, although these are not shown.

Transformers 36 and 37 each had one 117-volt winding and two 6.3-volt windings and were insulated for 5 kv.

The silicon controlled rectifier was a type 2N2326.

All diodes were 400-volt PIV silicon.

Resistors:

| | |
|---|---|
| **27** | 30,000 ohms variable. |
| **44** | 220,000 ohms fixed. |
| **50** | 2,700 ohms fixed. |
| **50'** | 15,000 ohms variable. |
| **58** | 25,000 ohms fixed. |

Capacitors:

| | |
|---|---|
| **28, 30** | 0.00047 microfarad. |
| **63** | 0.25 microfarad. |
| Voltage supply **55–56** | 125 volts D-C. |
| Voltage supply **65** | 117 volts A-C. |

Excellent results have been obtained with a tape recorder provided for two channel recordings at a tape speed of 1⅞ inches per second, the cartridge containing a 700 foot endless tape providing a recording time of slightly over one hour.

A single playback unit may be employed for all such automatic oscillographs in use on a single power system. This playback unit may consist of a conventional tape recorder arranged to feed a recording oscillograph, in which case the transcribed record will be the derivative of the recorded signal. The recorded signal is usually so nearly sinusoidal that the transcribed signal will be a reasonably good facsimile of it. If a conventional head is used and this has proved to be satisfactory in practice, a more elaborate amplifier than that usually employed in a conventional tape recorder is desirable to keep background noise to a minimum so as to permit greater amplification of records involving relatively low signals.

If a Hall effect head is used, the transcribed signal will be an exact replica of the recorded signal since this type of head reproduces the magnetic intensity recorded on the tape. This has the additional advantage that the tape may be run at a sufficiently slow speed so that a recording milliameter may be used in place of an oscillograph in transcribing the record. Also, the inherent noise in the high gain amplifier required will be filtered out.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. In a prefault recorder, continuous loop magnetic tape recorder means having electrically driven tape transport means, a recording head and an erasing head in advance thereof, means for energizing said tape transport means, transformer means adapted to be connected to a line conductor in which a fault condition is to be recorded, said transformer means having capability for producing output signals proportional to the current in the conductor, output connections on said transformer means, means for connecting said recording head to said output connections, electromechanical timer means for stopping said tape transport means at least several minutes after actuation of said timer means, and fault detector means operatively connected to said output connections and to said timer means for actuating said timer means, said fault detector means comprising rectifier means having its input in circuit with said transformer means output connections, output connections on said rectifier means, controlled rectifier means having anode, cathode and control element connections, the control element connection being connected at one side to the output connections of said rectifier means, the cathode connection being connected to the other side of the output connections of said rectifier means, a source of direct current operatively connected at one side to said cathode connection, electromechanical means for energizing said timer means, said electromechanical means being connected at one side to said anode connection and at the other side to the other side of said source of direct current.

2. In a prefault recorder for recording fault conditions in a plurality of line conductors, continuous loop magnetic tape recorder means having electrically driven tape transport means, a recording head for each conductor, an erasing head disposed adjacent the tape in advance of the recording heads, means for energizing the said tape transport means, individual transformer means adapted to be respectively connected to each conductor for producing output signals proportional to the current in the respective conductor, output connections on each transformer means, means for connecting each recorder head to the output connections of a respective transformer means, electromechanical timer means for stopping said tape transport means at least several minutes after actuation of said timer means, and fault detector means operatively connected to the output connections of all said transformer means and to said timer means for actuating said timer means, said fault detector means being responsive to the output signal from the first of said transformer means to produce an output signal in excess of a predetermined value, said fault detector means comprising a respective rectifier means for each of said transformer means, each of said rectifier means having its input in circuit with the output connections of the respective transformer means, output connections on each said rectifier means, the output connections of said rectifier means being all connected in parallel, controlled rectifier means having anode, cathode and control element connections, the control element connection being connected at one side to the output connections of said rectifier means, the cathode connection being connected to the other side of the output connections of said rectifier means, a source of direct current operatively connected at one side to said cathode connection, electromechanical means for actuating said timer means, and said electromechanical means being operatively connected at one side to said anode connection and at the other side to the other side of said direct current source.

3. A prefault recorder for use in connection with a power line conductor comprising a continuous loop tape recorder having a drive motor, a recording head and an erasing head more advanced than the recording head, a bias oscillator operatively connected to the recording head and to the erasing head, a source of electric power connected to the drive motor, a timer switch in the drive motor circuit including a timer for opening the drive motor circuit when the timer times out, a relay having a contact in circuit with the timer, electric power means for energizing the timer when the relay is energized, an isolation transformer having first, second and third windings, a current transformer being adapted to be connected to the power line and having a secondary connected to the second winding of the isolation transformer, connections from the third winding of the isolation transformer to the recording head, a bridge rectifier having input connections across the first winding of the isolation transformer and output connections, a silicon controlled rectifier having a gate connection, cathode connection and an anode connection, a source of direct current, means for connecting the positive side of the source of direct current through the relay coil to the anode connection of the silicon controlled rectifier, means for connecting the cathode connection of the silicon controlled rectifier to the negative side of the source of direct current and means for connecting the positive polarity output connection of the rectifier network to said gate connection and the negative output polarity connection of the rectifier network to the negative side of the source of direct current.

4. A prefault recorder of claim 3, in which a biasing diode is interposed between said silicon controlled rectifier and said negative side of the source of direct current with the anode of said biasing diode connected to the cathode connection of said silicon controlled rectifier and the cathode of said biasing diode being connected to the negative side of the source of direct current.

5. In a prefault recorder, a continuous loop magnetic tape recorder having a drive motor, a plurality of recording heads and an erasing head more advanced than the recording heads, a biasing oscillator operatively connected to the recording heads and to the erasing head, a source of electric energy operatively connected to the drive motor, an electric timer controlled lockout switch in circuit between the drive motor and electric power source and adapted to open the drive motor circuit when the timer times out, a normally open relay having contacts and a relay coil, electric power means connected to said relay contacts when they are closed and through them to the timer to energize the timer, a like plurality of isolation transformers each having first, second, and third windings, connections from the third winding of each of the isolation transformers to a respective recording head, a like plurality of bridge rectifiers each having input connections connected across the first winding of a respective isolation transformer and having output connections, a silicon controlled rectifier having a cathode connection, having a gate connection connected to the positive polarity output connection of all of said bridge rectifiers and having an anode connection connected to one side of the relay coil and a source of direct current which is connected at the negative side to the cathode connection of the silicon controlled rectifier and which is connected at the positive side to the opposite side of the relay coil, the negative side of said power source being connected to the negative polarity output terminals of all of said bridge rectifiers.

6. A recorder of claim 5, in combination with a source of AC calibrating voltage and switch means to connect the source of AC calibrating voltage operatively to all of the recorder heads and switch means for connecting the power source for energizing the drive motor when the source of calibrating voltage is connected.

7. In a prefault recorder, a continuous loop magnetic tape recorder having a drive motor, a plurality of recording heads and an erasing head in advance of said recording heads, a source of direct current operatively connected to drive the drive motor, an electric timer controlled lockout switch in circuit between the drive motor and said source of direct current and adapted to open the drive motor circuit when the timer times out, a like plurality of split core isolation transformers each having connected in its secondary winding circuit an adjustable gain amplifier and the primary winding of an output transformer having a center-tapped secondary winding, a rectifier comprising a pair of diodes connected in full wave center tap configuration in the secondary winding circuit of each of said output transformers, all of the outputs of said rectifiers being connected in parallel, a silicon controlled rectifier having a gate connection, a cathode connection and an anode connection, means for connecting the positive polarity outputs of said rectifiers to said gate connection, means for connecting the negative polarity outputs of said rectifiers and said cathode connection to the negative side of said source of direct current, and means for connecting the electric timer of said lockout switch in circuit between said anode connection and the positive side of said source of direct current.

References Cited

UNITED STATES PATENTS

| | | | |
|---|---|---|---|
| 2,378,388 | 6/1945 | Begun | 179—100.2 X |
| 2,378,389 | 6/1945 | Begun | 346—74 X |
| 2,521,623 | 9/1950 | Arndt | 179—100.2 X |
| 2,548,028 | 4/1951 | Klammer | 317—141 X |
| 3,214,641 | 10/1965 | Sonnemann | 317—36 |
| 3,297,913 | 1/1967 | Schweitzer | 317—36 |
| 3,300,685 | 1/1967 | Zocholl | 317—36 |

BERNARD KONICK, *Primary Examiner.*

L. J. SCHROEDER, *Assistant Examiner.*